United States Patent [19]

Lee et al.

[11] 3,886,315

[45] May 27, 1975

[54] ARRANGEMENT AND METHOD OF SIGNALLING BOTH WAYS THROUGH A TWO WIRE ELECTRONIC JUNCTOR

[75] Inventors: David Q. Lee, Chicago; Donald W. McLaughlin, Bolingbrook, both of Ill.

[73] Assignee: GTE Automatic Electric Laboratories Incorporated, Northlake, Ill.

[22] Filed: Oct. 1, 1973

[21] Appl. No.: 402,530

[52] U.S. Cl. ............................................ 179/18 AH

[51] Int. Cl. .......................... H04m 7/10; H04q 1/52

[58] Field of Search .................... 179/18 GE, 18 AH

[56] References Cited

UNITED STATES PATENTS 3,838,224 9/1974 Richards ....................... 179/18 AH

*Primary Examiner*—William C. Cooper
*Attorney, Agent, or Firm*—Robert J. Black

[57] ABSTRACT

This invention relates to an electronic private automatic branch exchange which is a two wire system using junctors as a means of connecting two line circuits together via a solid state matrix. An arrangement and method is disclosed for signalling both ways through the junctor.

9 Claims, 13 Drawing Figures

ARRANGEMENT AND METHOD OF SIGNALLING BOTH WAYS THROUGH A TWO WIRE ELECTRONIC JUNCTOR

This invention relates to telephone communication systems, and more particularly, to an improved electronic private automatic branch exchange (PABX).

Private automatic branch exchanges traditionally have incorporated all of the switching techniques normally utilized in telephone central offices. Many of these types of private switching systems employ the well-known step-by-step or "Strowger" principle, while still others are of the common control type employing crossbar switches or similar devices as the technique for establishing a path between two stations.

The introduction of electronic techniques in circuitry to the telephone communication field to date has found its greatest utilization in the area of central office switching and signal transmission. Until recently, the usage of these techniques in PABX telephone systems has been limited primarily because of cost considerations. Certain recent developments primarily in the areas of common control equipment and particularly memory circuitry have made the design of electronic PABX's more attractive economically. Use of stored program common control and solid state devices permits a considerable reduction in the amount of equipment installed in customer premises.

In the hereinafter generally described private automatic branch exchange, electronically implemented, common control equipment of a generally conventional type and operation is used. The system is a two-wire system using junctors as a means of connecting two line circuits together via a solid state crosspoint matrix. The junctor has two ports on the outlet side of the matrix and the lines appear as inlets on the matrix.

The present invention particularly relates to a new and unique arrangement and method of signalling both ways through such a two wire electronic junctor circuit.

BRIEF DESCRIPTION OF THE DRAWINGS

For a fuller understanding of the nature and objects of the invention, reference should be had to the following detailed description taken in connection with the accompanying drawings, in which.

Similar reference characters refer to similar parts throughout the several views of the drawings.

DESCRIPTION OF THE PREFERRED EMBODIMENT

Figure 1:
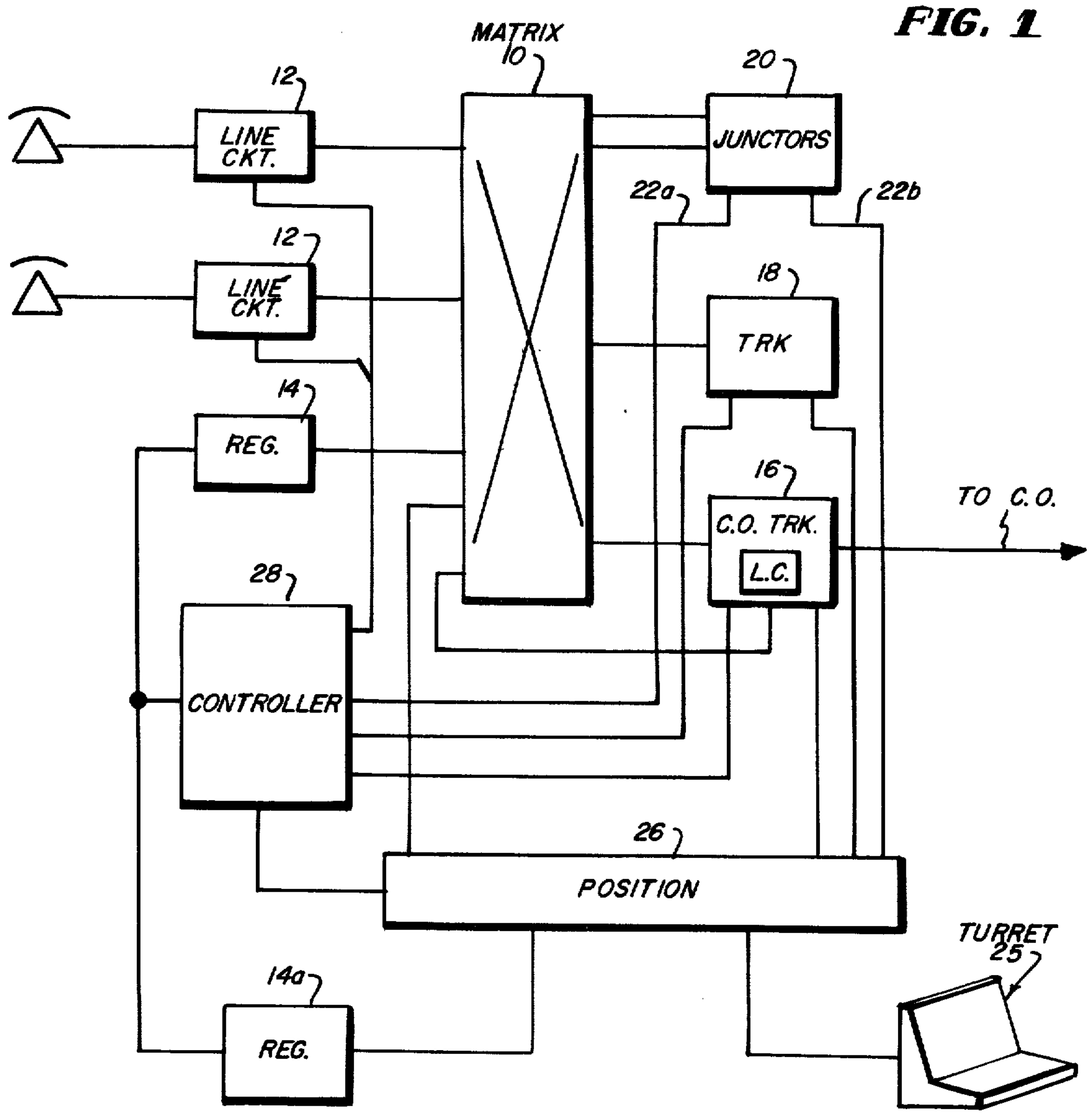
FIG. 1 is a block diagram schematic of the private automatic branch exchange.
Figure 2:
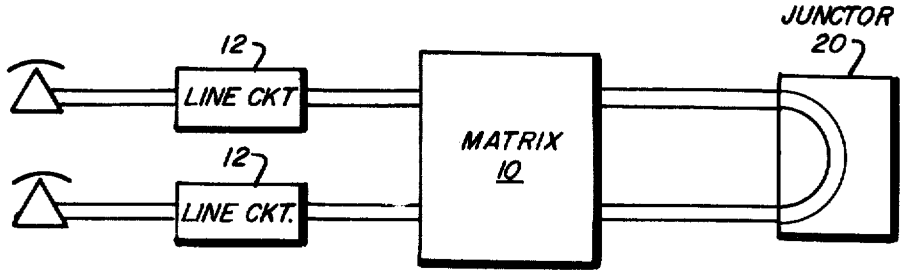
FIG. 2 is a block diagram representation of the two matrix paths allowing for a line to line connection.

Referring now to the drawings, and particularly FIG. 1 thereof, the electronic private automatic branch exchange can be seen to include a single stage matrix 10 with lines on line circuits 12 and registers 14 as inlets, and central office trunks 16, information trunks 18 and junctors 20 as outlets. In the illustrated embodiment, the matrix 10 provides a maximum of 96 inlets and 48 outlets. As indicated above, the system is a two wire system using the junctors 20 as a means of connecting two line circuits 12 together via the matrix 10. For this purpose, each junctor 20 has two ports on the outlet side of the matrix 10 and the line circuits 12 appear as inlets on the matrix, thus two matrix paths allow for a line to line connection, as generally illustrated in FIG. 2. Each central office trunk 16 has an inlet associated with it to provide a hookswitch transfer feature, as described more fully below. Briefly, the system's construction and operation are as set forth in the paragraphs below.

The line circuits 12 and the junctors 20 are all electronic, containing no HQA relays. DC signalling is used, and busy tone is injected via the junctors 20. Disconnection control is in the junctors 20, and allows an off-hook flash to pass through the junctors 20 without disconnecting.

The single stage matrix 10 is a solid state crosspoint matrix of the type generally well-known in the art.

The central office trunks 16 and the information trunks 18 contain hybrid circuits in that HQA relays and transistor and IC logic all are used. In the illustrated embodiment, a maximum of 22 central office trunks can be provided, and each contains half the junctor (provides the outlet matrix termination), the central office interface (electromechanical), an abbreviated line circuit (for hookswitch transfer inlet matrix termination), timing and control logic (recognized hookswitch flash, disconnect, etc.), and system interface (two marker highways and position interface).

There are a maximum of four information trunks 18. The approach to extendable trunk operation is to switch the line to an idle central office trunk via position and controller operation rather than extending through the trunk. If four information trunks 18 are provided, 20 central office trunks 16 can be used and if 2 information trunks 18 are provided, all 22 central office trunks 16 can be used.

There are a total of four registers 14 in the system, with one (register 14*a*) being reserved for the position circuit 26 and the other three for non-position generated calls. Accordingly, the smallest system configuration requires two system registers and one position register.

The operation of the private automatic branch exchange is controlled by a turret 25, a position circuit 26 and a controller 28. The turret 25 may be a Type 80 turret of the G.T.E. Automatic Electric Inc. type, or its equivalent, which provides up to 22 central office trunk keys and four information trunk keys. Included with the many features of such a Type 80 turret which are associated with an operated trunk key, are split inward, split outward, monitor, hold, break-in and camp on.

The position circuit 26 provides single turret operation and provides logic to interface 22, central office trunks 16 and four information trunks 18. It also contains the turret interfaces not terminated directly to the trunks, that is, the turret to system signals either terminate directly to the trunks or the position circuit. The position circuit 26 also provides the interface to the controller 28, the interface to its registers 14 and the PAX line logic.

The controller 28 includes the following circuits and operations: a marker which provides path control, termination interfaces for seizure detection, busy/idle checks, class mark reception, and recognition of register and position requests for service; a translator which provides class mark decodes, numbering plan, and routing restrictions and selection (function of dialed digits); a register memory which is four, 12 bit memory words per register and read/write logic; a position and feature interface which allows the position and feature circuits to request various marker functions; and a system controller and clock which provides miscellaneous detection logic, sequence controls and system timing.

For the purpose of generally illustrating the operation of the private automatic branch exchange, in FIGS. 3–5, the method of operation for five typical operations is illustrated. All features of the system are provided using similar basic operations. By using inlet and outlet class marks, restrictions and routing selections are accomplished in conjunction with the dialed digit or digits. All routing is single digit except line selection which is always 2*xx* where the second and third digits determine the line identity.

Figure 3A:
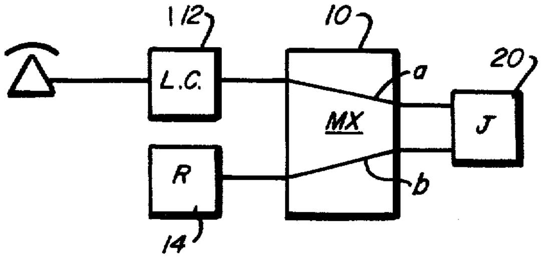
FIGS. 3A, 3B, 3C, 3D, 4A, 4B, 5A and 5B generally illustrate the operation of the system for several typical operations.
Figure 3B:
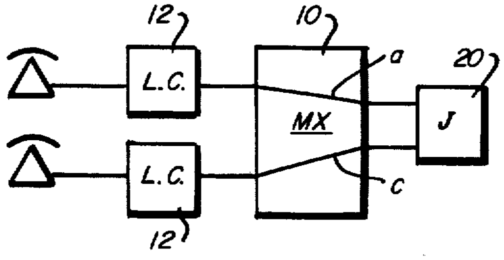

For example, as generally illustrated in FIGS. 3A and 3B, on a line-to-line call (dial 2*xy*), the line circuit 12 is seized and coupled through the matrix 10, via the indicated path *a*, to a junctor 20, and then from the junctor 20 to a register 14, via the indicated path *b* through the matrix 10. The controller 28 controls the establishment of the connections through the matrix 10. Dial tone is returned and, after dialing, the junctor 20 is coupled to the called line's line circuit 12, via the indicated path *c* (FIG. 3B) through the matrix 10. Ringing is extended to the called line and, upon answer, ring trip and conversation takes place, followed by release.

Figure 3C:
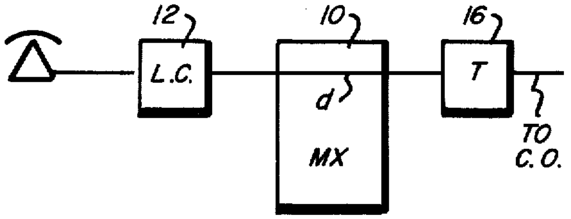

On a line-to-trunk call (dial 9), the calling line is coupled through the matrix 10 to a junctor 20, and hence to a register 14, in the same manner as described above and illustrated in FIG. 3A. In this case, however, the line circuit 12 is coupled through the matrix 10, via the indicated path *d*, directly to a central office trunk 16, as illustrated in FIG. 3C. Dial tone is received from the central office, and dialing is to the central office. The latter also returns ringback, answer and ring trip. Following conversation, release occurs.

Figure 3D:
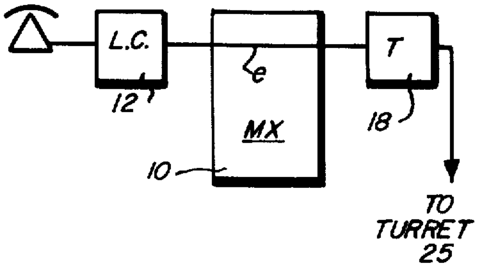

On a line-to-turret call (dial 0), the line circuit 12 again is coupled to a register, as illustrated in FIG. 3A, and then, as shown in FIG. 3D, to an information trunk 18, via the indicated path *e* through the matrix 10, which connects the line circuit to the turret 25. After ringing the turret, answer, ring trip and conversation occur, followed by release.

Figure 4A:
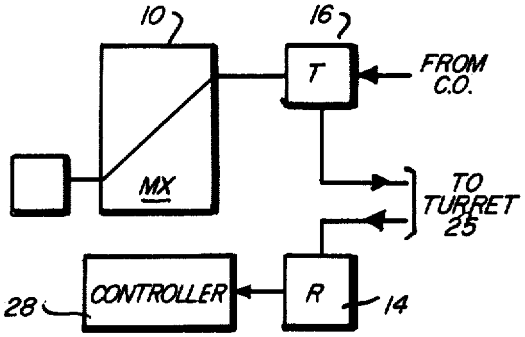
Figure 4B:
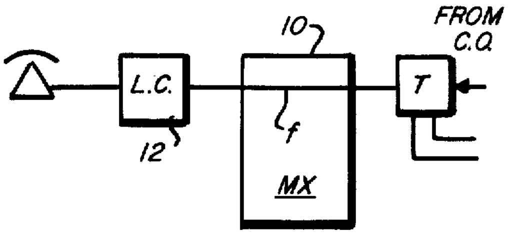
Figure 5A:
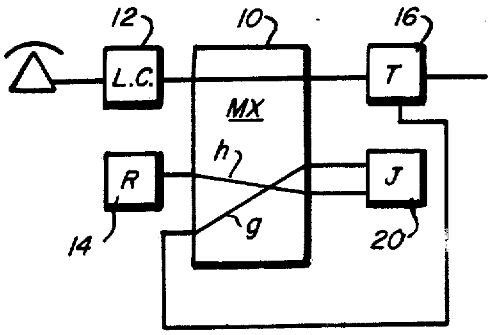
Figure 5B:
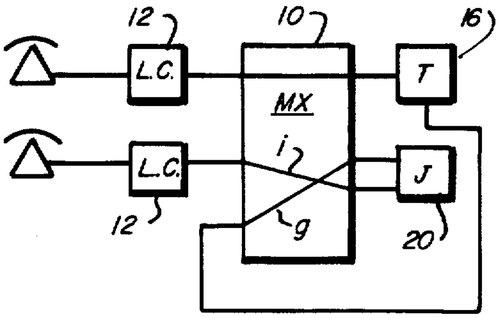

FIGS. 4A and 4B illustrate the operation on a trunk to line via turret call. The call is extended through a central office trunk to the turret 25, whereupon ringing and seizure takes place. Upon answer, the call is extended to the position circuit 26 which couples the central office trunk to a position register 14 that is wired to the position circuit. Dial tone is returned, and dialing is performed at the turret 25. The central office trunk 16 is coupled through the matrix 10, via the indicated path *f*, to the line circuit 12, as illustrated in FIG. 4B. The line circuit 12 is rung, and after answer, ring trip and conversation, release occurs.

During hookswitch transfer, on a call established from a trunk to a line via the turret in the manner described above and illustrated in FIGS. 5A and 5B, the line circuit 12 upon a hookswitch flash is coupled through the central office trunk 16 and the matrix 10, via the indicated path *g*, to a junctor 20. From the junctor 20, it is again extended through the matrix 10, via the indicated path *h*, to a register 14. Dial tone is returned and, upon dialing, a path is established from the junctor 20 to the called line circuit 12 through the matrix 10, via the indicated path *i*. The line circuit is rung and following answer, ring trip, conversation and release again occur.

From the above general description of the operation of the private automatic branch exchange, it can be seen that supervision requirements in the system call for off-hook/on-hook signalling both ways via the junctors 20 and for the junctors to act on these signals, that is, the junctors 20 do not just pass them on. This type of supervision allows for the following functions:

a. Line seizure seen at the line.

b. Dial pulsing to the register via the junctor. This is from the originating line into the junctor and out of the junctor to the register which looks like a terminating line to the junctor.

c. With ringing enabled, the control being in the junctor, the answer must be passed to the junctor to "trip" the ringing.

d. If a busy line was encountered, the busy tone is controlled in the junctor to the originating line. The on-hook must be sent to the junctor to "trip" the busy tone.

e. The hold path is controlled in the junctor so disconnect (on-hook) must be passed on to the junctor from both the originating and terminating line.

f. The above conditions do not require signals from the terminating line or the junctors to be sent to the originating line.

In accordance with the present invention, in order to provide signalling both ways through the two wire junctors 20, the sending and receiving functions are segregated to limit voltage and current levels so that voltage source variations and component tolerance variations will not result in overlaps of levels. This results in more simple level detectors and injectors because of the controlled discrete voltage level changes. The send-receive functions also are flipped in the junctors using cross-wired detector-injector operations, to allow the junctors to sense the detector outputs as they are fed into the injectors, all as more fully described below.

Figure 7:
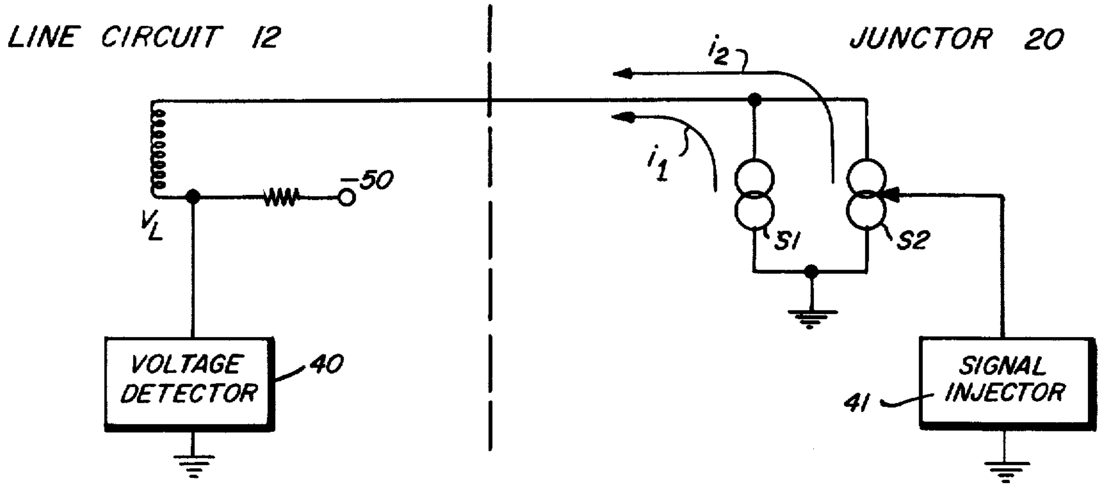
FIG. 7 illustrates the principle of junctor to line signalling.
Figure 8:
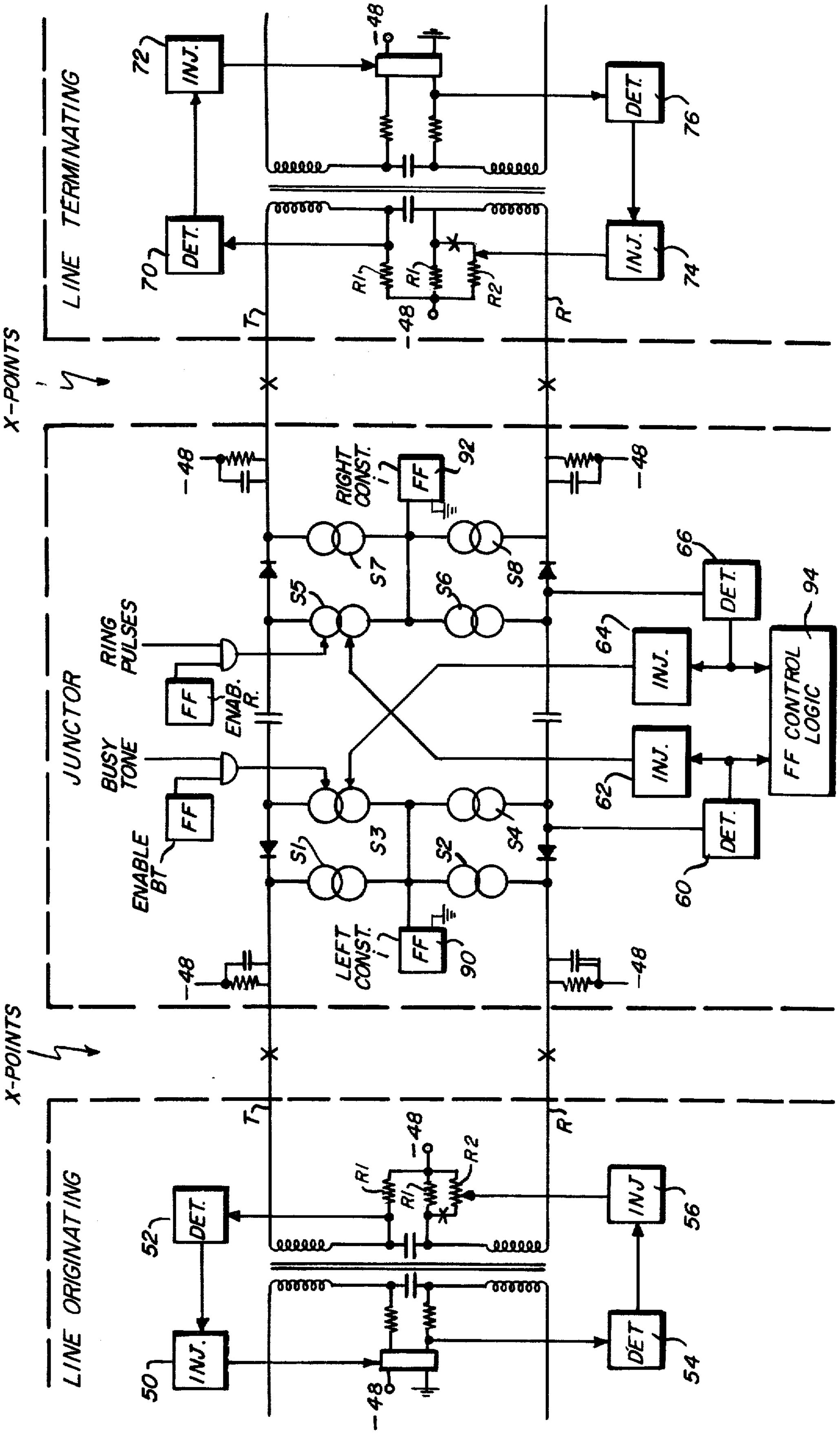
FIG. 8 is a partial schematic, partially block diagramed, of a connection of an originating line to a terminating line through a junctor, for the purpose of describing the system's method of signalling.

More particularly, the method of signalling both ways through a two wire electronic junctor 20, in accordance with the invention, is illustrated in FIG. 8 which is a partial schematic, partially in block diagram, illustrating an originating line connected to a terminating line by means of a junctor. In FIG. 8, the connection through the matrix 10 is generally illustrated but not shown for the sake of clarity. However, before referring to this figure, reference is made to FIG. 6 which illustrates the principle of signalling from the line to the junctor, and to FIG. 7 which illustrates the principle of signalling from the junctor to the line.

Figure 6:
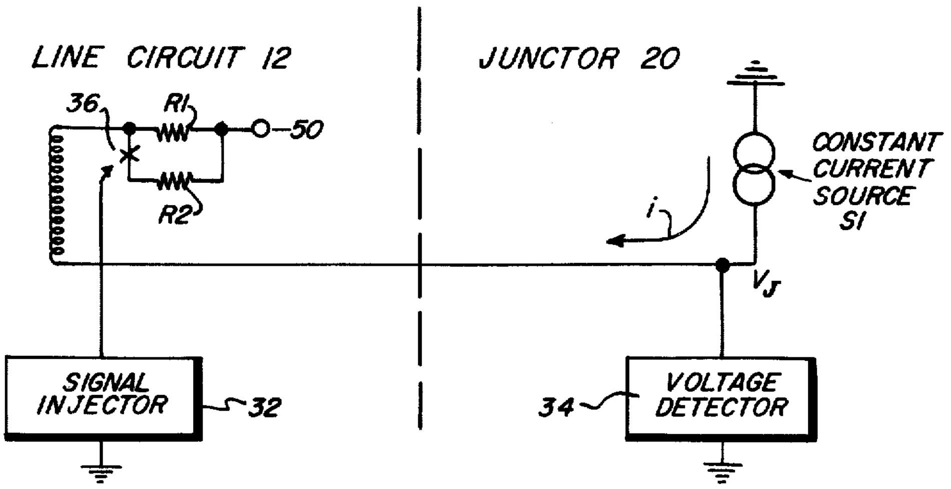
FIG. 6 illustrates the principle of line to junctor signalling.

In FIG. 6, the principle is that a constant current source S1 is in the junctor 20 and feeds a fixed resistance R1 in the line circuit 12. This current source in the described PABX is actually the current source for the hold current which is used to keep the solid state crosspoint matrix path up, that is, the connection of this line to this junctor. By varying the line resistance, that is, by adding resistance R2 by means of a signal injector 32, a voltage shift is seen in the junctor 20, by the voltage detector 34, since the constant current source is not affected by the variation in line resistance. Signals therefore can be superimposed over the minimum hold current, as signals from the line to the junctor.

For example, for purposes of explanation, assume that R1 = R2. With the contact 36 (representing the signal injector 32), the voltage seen at the junctor 20 ($V_J$) is:

$V_J = iR1$ if $i = 20$ *ma*

$R1 = 1000$ ohms $V_J = 20$ volts (above −50 volts)

With contact 32 closed, the voltage seen at the junctor ($V_J$) is:

$V_J = R1/2$ if $i = 20$ *ma*

$R1 = R2 = 1000$ ohms $V_J = 10$ volts (above −50 volts)

Thus, voltage shifts can be detected at the junctor 20. The method of varying the resistance is not important for it can be varied in numerous different ways. For example, the contact 36 (signal injector 32) can be electronic, that is, a transistor in series, or it can be a relay contact. Accordingly, the principle of operation and not the specific circuit design is the important feature and novel aspect of the invention.

In FIG. 7, the principle of operation in signalling from the junctor to the line is illustrated, and the above comments also apply in this case. Here, again, the same principle is used except instead of varying the line resistance R, a second constant current source S2 is placed in the junctor. Now, by turning this current source S2 off and on, the voltage drop across the line resistance R will vary, and signals can be sent from the junctor to the line.

As an example, assume $i1 = i2$. With constant current source S1 only on, the voltage seen at the line ($V_L$) is:

$V_L = i_1R$ if $i_1 = 20$ *ma*

$R = 1000$ ohms $V_L = 20$ volts (above −50 volts)

With constant current source S1 and S2 both on, $V_L$ is:

$V_L = 2i_1R$ if $i_1 = i_2 = 20$ ma $R = 1000$ ohms $V_L = 40$ volts (above −50 volts)

Therefore, voltage shifts (or currents) can be detected, by the voltage detector 40. The constant current source S2 can be switched into and out of the junctor, by a signal injector 41 which, as indicated above, can be electronic in operation such as a transistor switch or even a relay contact.

Referring now to FIG. 8, an originating line is shown to include signal injectors 50 and 56, and detectors 52 and 54. The detector 54 detects the variation in the line voltage, that is, as a result of an off-hook condition, and operates the signal injector 56 to vary the line resistance (R1 + R2) on the R lead to the junctor, as described above. Correspondingly, a variation in the line voltage on the T lead is detected by the detector 52, coupled to the signal injector 50 to operate it, to pass the signal on to the line.

The terminating line includes detectors 70 and 76, and signal injectors 72 and 74, which function in the same manner as those described in the originating line.

The line resistances in the originating line and the terminating line have been designated in the same fashion as illustrated in FIGS. 6 and 7, for purposes of cross-reference. In addition, a fixed line resistance is illustrated in each T lead.

The junctor is seen to include detectors 60 and 66, and signal injectors 62 and 64, as well as constant current sources S1–S8. The constant current sources S1 and S2 are controlled by the left constant *i* FF 90, and the constant current sources S7 and S8 are controlled by the right constant *i* FF 92. As indicated above, these current sources may be those providing the holding current for holding up the connections through matrix 10, from the originating line to the junctor, and from the junctor to the terminating line. In such a case, the right and left constant i FF's 92 and 90 are controlled by the controller 28, in establishing the indicated connections. The constant current sources S3 and S5 are controlled by the signal injectors 64 and 62, respectively. The detectors 60 and 66 detect the variations in the voltage shifts on the R leads from the originating and terminating lines, respectively. It may be noted that the arrangement is such that a signal, for example, detected on the R lead from the originating line is detected by the detector 60, and flipped and coupled to the terminating line via its T lead, by the signal injector 62. Correspondingly, signals on the R lead from the terminating line are detected by the detector 66, flipped and coupled to the originating line's T lead, by the signal injector 64. The operation in this respect may be controlled by a FF control logic circuit 94. Again, as indicated above, the principle of operation, and not the detailed or specific circuit design used to perform each function, is the important point or aspect of the invention, for in knowing the principle of operation, the necessary circuitry and logic can be designed by any engineer skilled in the art. For this reason, none of the control circuitry has been specifically illustrated or described.

Using the principles described above and illustrated in FIGS. 6–8, three operations are possible. First, the originating line can signal via the R lead to the junctor and this signal is passed to the terminating line by reinjecting the signal on its T lead. For example, the signal injector 56 is operated to vary the line resistance (R1 and R2), as described above in relation to FIG. 6, and the voltage shift on the R lead is seen in the junctor and detected by the detector 60. The signal injector 62 passes the signal on to the terminating line by reinjecting it on its T lead, by operating the constant current source S5 so that both the constant current sources S5 and S7 now are in the circuit. This varies the voltage drop across the line resistance R1 in the terminating line, and this variation in the voltage drop is detected by the detector 70, as described above in relation to FIG. 7. If the terminating line is a register, the signal could be dial pulses.

Signalling from the terminating to the originating line likewise is possible by taking the signals on the terminating line's R lead and reinjecting them on the originating line's T lead. In this case, the signal injector 74 places the signal on the R lead, and the signal upon being detected by the detector 66, is reinjected by the signal injector 64 operating the constant current source S3, onto the originating line's T lead. The signal then is detected by the detector DET 52. It therefore is possible for two way signals to pass through the junctor independently, with the signals being superimposed on the hold currents required to keep the two connections up, that is, line to junctor and junctor to line.

A third operation or result is that the junctors can detect supervision from both lines via their respective R leads and inject signals to each line on their respective T leads. This allows for:

a. Injecting busy tone to the originating line via its T lead and tripping it when an on-hook is seen via its R lead.

B. Injecting a ring signal (square wave) to the terminating line via its T lead and tripping it when answer (off-hook) is seen via its R lead.

c. Disconnects can be seen via both R leads and these are used to reset all current sources and drop the connection.

Accordingly, from the above description, it can be seen that this scheme allows for segregated signalling in any two wire system such that the R lead is used by the junctor to receive information from the respective line termination, and the T lead is used to transmit to the respective line termination. The sent and received data are DC signals superimposed on a constant DC hold level. This data is available to the junctor and can be simulated or altered by the junctor, that is, the junctor is an active controlled rather than a passive element in this data transfer operation.

It will thus be seen that the objects set forth above among those made apparent from the preceding description, are efficiently attained and certain changes may be made in carrying out the above method and in the construction set forth. Accordingly, it is intended that all matter contained in the above description or shown in the accompanying drawings shall be interpreted as illustrative and not in a limiting sense.

Now that the invention has been described, what is claimed as new and desired to be secured by Letters Patent is:

1. A communication system comprising a plurality of telephone stations, each including a line circuit, a plurality of junctors and a matrix, said system being a two wire system and using said junctors as a means of connecting any two line circuits together via said matrix, said line circuits each appearing as an inlet on said matrix and each of said junctors having two ports on the outlet of said matrix, the arrangement being such that one of said two wires is used by said junctors to receive information from said line circuits and the other one of said two wires is used by said junctors to transmit information to said line circuits, the sent and received information being direct current signals superimposed on a constant direct current hold level.

2. A communication system, as claimed in claim 1, wherein one of said two wires connecting a line circuit and a junctor comprises an R lead and the other one thereof comprises a T lead, said junctor receiving information from one of said line circuits on said R lead and coupling said information to the other one of said line circuits on the T lead connecting said junctor and said other one of said line circuits, whereby signals can be sent both ways through said junctor from one line circuit to another.

3. A communication system, as claimed in claim 1, wherein said junctors each includes a first constant current source and said line circuits each includes resistance means in one of said two wires, said first constant current source of each said junctor feeding said resistance means to provide said constant direct current hold level, said resistance means being varied to provide a voltage change in said junctor, and detector means in each of said junctors for detecting said voltage change, whereby information can be superimposed over said constant direct current hold level as signals from a line circuit to a junctor.

4. A communication system, as claimed in claim 1, wherein said junctors each includes a first and a second constant current source and said line circuits each includes a fixed resistance in one of said two wires, said first constant current source of each said junctor feeding said fixed resistance to provide said constant direct current hold level, said second constant current source feeding said fixed resistance and being turned on and off to vary the voltage drop across said fixed resistance, detector means in each of said line circuits for detecting the variation in the voltage drop across said fixed resistance therein, whereby information can be superimposed over said constant direct current hold level as signals from a junctor to a line circuit.

5. A communication system, as claimed in claim 1, wherein one of said two wires connecting a line circuit and a junctor comprises an R lead and the other one thereof comprises a T lead, said line circuit including resistance means in each said R lead and said T lead, said junctor including a first constant current source feeding said resistance means in each said R lead and said T lead to provide said constant direct current hold level, a second constant current source in said junctor feeding said resistance means in said T lead and being turned on and off to vary the voltage drop across said resistance means in said T lead, detector means in said line circuit for detecting the variation in said voltage drop across said resistance means in said T lead, said resistance means in said R lead being varied to provide a voltage change in said junctor, and detector means in said junctor for detecting said voltage changes, whereby information can be sent from said line circuit to said junctor by varying said resistance means in said T lead and information can be sent from said junctor to said line circuit by varying the voltage drop across said resistance means in said T lead, said voltage change being detected by said detector in said junctor and the variation in the voltage drop being detected by said detector in said line circuit.

6. A communication system, as claimed in claim 5, wherein said junctor upon detecting a voltage change on the R lead from one of said line circuits turns on said second constant current source feeding said resistance means in said T lead of another one of said line circuits to vary the voltage drop across said resistance means in said T lead, the same being detected by said detector in said other one of said line circuits, whereby said one line circuit can signal the other one of said line circuits through said junctor connecting them.

7. In a communication system comprising a plurality of telephone stations, each including a line circuit, a plurality of junctors and a matrix, said system being a two wire system using said junctors as a means of connecting any two line circuits together via said matrix, said line circuits each appearing as one of a plurality of inlets on said matrix and each of said junctors having two ports on the outlets of said matrix, a method of signalling both ways through said junctor comprising the steps of providing in a line circuit resistance means in one of said wires, providing a constant current source in a junctor connected with said line circuit and feeding said resistance means therewith, signalling said junctor from said line circuit by varying said resistance means to cause a voltage change in said junctor, and detecting said voltage change in said junctor, thereby providing signals from said line circuit to said junctor as voltage changes which can be detected.

8. The method of claim 7, further including the steps of providing in said line circuit resistance means in the other one of said wires, providing a first and a second constant current source in said junctor, said first and second constant current sources feeding said resistance means in said other one of said wires, said second constant current source being turned on and off to vary the voltage drop across said resistance means in said other one of said wires, and providing means in said line circuit for detecting the variations in the voltage drop across said resistance means, whereby signals can be sent from said junctor to said line circuit by turning said second constant current source on and off to vary the voltage drop across aid resistance means in said other one of said wires and detecting the voltage drop variations.

9. The method of claim 8, wherein a signal is coupled to said junctor from one line circuit on one wire (R lead) and is transferred by said junctor to another line circuit on the other wire (T lead).

* * * * *